United States Patent  
Babon et al.

(10) Patent No.: US 12,184,992 B2
(45) Date of Patent: Dec. 31, 2024

(54) METHOD AND DEVICE FOR GENERATING AN IMAGE

(71) Applicant: INTERDIGITAL CE PATENT HOLDINGS, SAS, Paris (FR)

(72) Inventors: Frederic Babon, Chateaubourg (FR); Guillaume Boisson, Pleumeleuc (FR); Tristan Langlois, Chateaugiron (FR)

(73) Assignee: InterDigital CE Patent Holdings, SAS, Paris (FR)

(*) Notice: Subject to any disclaimer, the term of this patent is extended or adjusted under 35 U.S.C. 154(b) by 112 days.

(21) Appl. No.: 17/798,678

(22) PCT Filed: Feb. 18, 2021

(86) PCT No.: PCT/EP2021/053982
§ 371 (c)(1),
(2) Date: Aug. 10, 2022

(87) PCT Pub. No.: WO2021/165375
PCT Pub. Date: Aug. 26, 2021

(65) Prior Publication Data
US 2023/0140541 A1 May 4, 2023

(30) Foreign Application Priority Data
Feb. 18, 2020 (EP) .................. 20305151

(51) Int. Cl.
H04N 23/951 (2023.01)
H04N 5/265 (2006.01)
H04N 23/90 (2023.01)

(52) U.S. Cl.
CPC .......... *H04N 23/951* (2023.01); *H04N 5/265* (2013.01); *H04N 23/90* (2023.01)

(58) Field of Classification Search
CPC ...... H04N 23/951; H04N 5/265; H04N 23/90; H04N 23/69; H04N 23/698; H04N 23/45;
(Continued)

(56) References Cited

U.S. PATENT DOCUMENTS 9,262,801 B2 2/2016 Macmillan et al.
9,497,380 B1 11/2016 Jannard et al.
(Continued)

OTHER PUBLICATIONS http://lightfield-forum.com/2018/12/light-field-patent-lg-smartphone-with-4x4-camera_array/ Markus "Light-Field Patent: LG Smartphone with 4X4 Camera Array", 2018, 3 pages.
(Continued)

*Primary Examiner* — Timothy J Henn
(74) *Attorney, Agent, or Firm* — Smadar Gefen

(57) ABSTRACT

A method and system are provided for generating an image from each camera array in a camera array matrix. In one embodiment, the method comprises increasing redundancy between to be captured images from the camera matrix by rotating direction of any cameras disposed in upper and lower rows of said matrix by a 90 degree angle around the roll axis. Then any cameras disposed at the corners of the matrix are rotated in an angle that is less than 90 degrees around the roll axis. Subsequently, the location of central cameras are determined and analysed so that they can be rotated and disposed in a manner that provides both horizontal and vertical compensation for any redundancies.

16 Claims, 19 Drawing Sheets

(58) Field of Classification Search
CPC .................. H04N 23/58; H04N 23/957; G06T 2207/10028
See application file for complete search history.

(56) References Cited

U.S. PATENT DOCUMENTS

| | | | |
|---|---|---|---|
| 9,699,379 B1* | 7/2017 | Baldwin | H04N 23/698 |
| 9,948,832 B2 | 4/2018 | Laroia et al. | |
| 10,979,652 B1* | 4/2021 | Jun | H04N 23/55 |
| 2015/0109524 A1* | 4/2015 | Laroia | H04N 23/51 |
| | | | 348/369 |
| 2015/0278988 A1 | 10/2015 | Macmillan et al. | |
| 2015/0296154 A1* | 10/2015 | Laroia | G02B 7/09 |
| | | | 348/340 |
| 2017/0134651 A1* | 5/2017 | Lo | H04N 23/90 |
| 2017/0339391 A1* | 11/2017 | Zhou | H04L 65/613 |
| 2017/0374240 A1* | 12/2017 | Laroia | H04N 5/04 |
| 2018/0176541 A1 | 6/2018 | Abbas et al. | |
| 2019/0098287 A1 | 3/2019 | Cabral et al. | |
| 2019/0297238 A1* | 9/2019 | Klosterman | G06T 7/37 |

OTHER PUBLICATIONS http://graphics.stanford.edu/projects/array/ "The Stanford Multi-Camera Array" 2011, 3 pages.
International Search Report for PCT/EP2021/053982 issued Apr. 6, 2021, 2 pages.

* cited by examiner

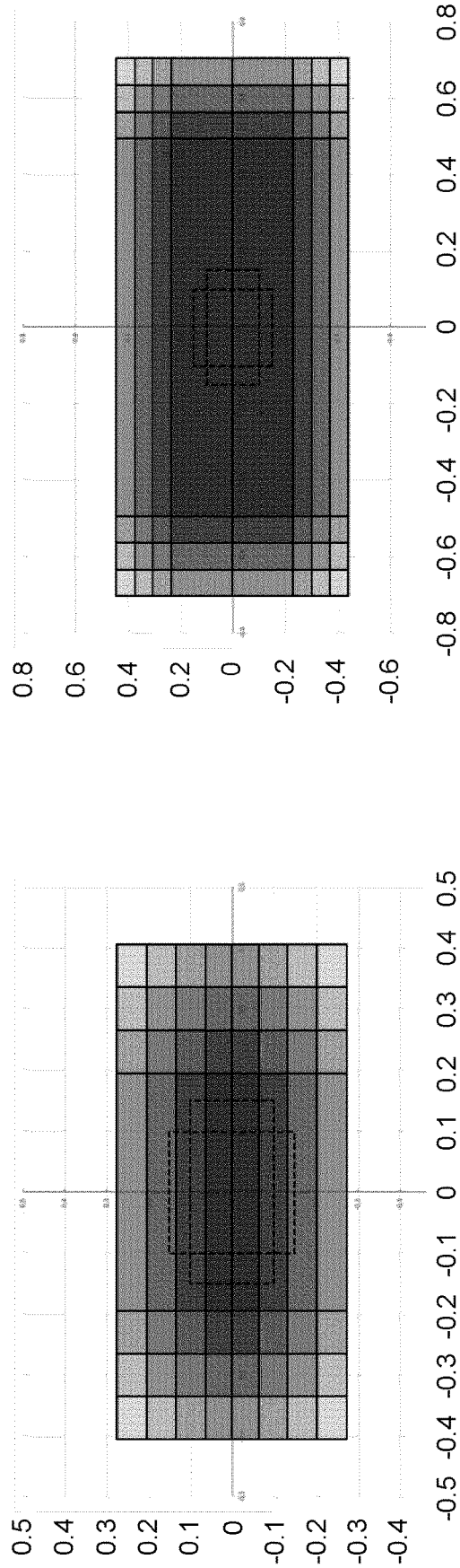
Figure 7
Figure 8
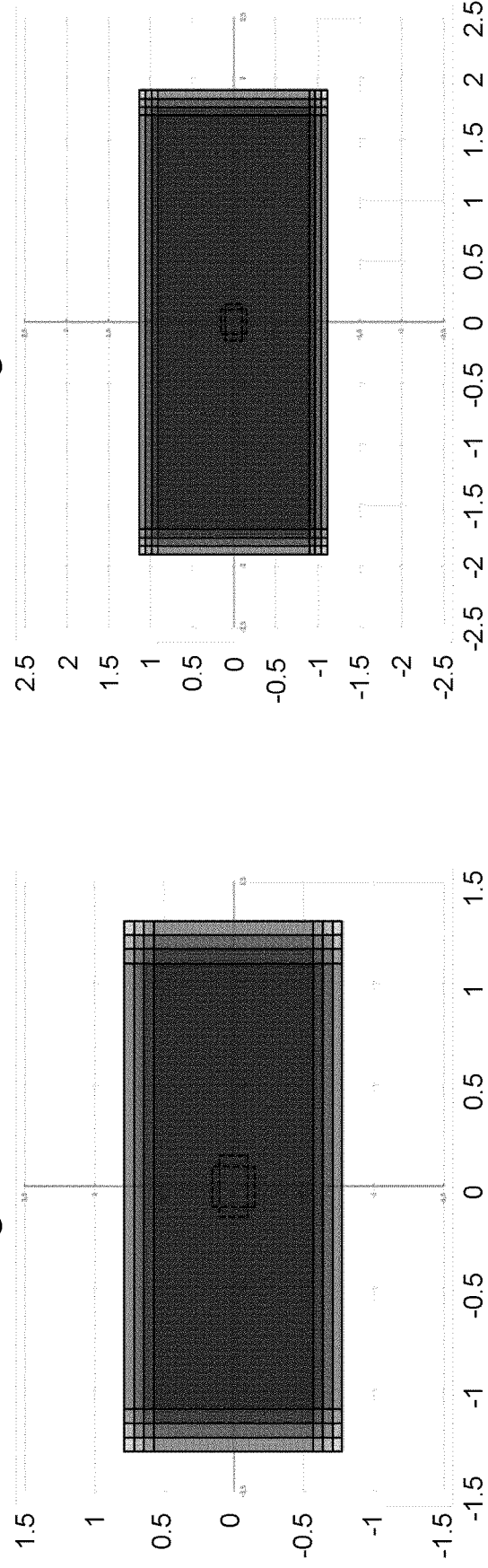
Figure 9
Figure 10

|  | Row 1 – Row 2 | Row 2 – Row 3 | Row 3 – Row 4 |
|---|---|---|---|
| Original Spacing Between Cameras | 7 cm | 7 cm | 7 cm |
| Off-centered Horizontal Spacing | 4 cm | 13 cm | 4 cm |
| Off-centered Vertical Spacing | 5 cm | 11 cm | 5 cm |

Figure 22

METHOD AND DEVICE FOR GENERATING AN IMAGE

CROSS REFERENCE TO RELATED APPLICATIONS

This application is a U.S. National Stage Application under 35 U.S.C. § 371 of International Patent Application No. PCT/EP2021/053982, filed 18 Feb. 2021. which is incorporated herein by reference in its entirety.

This application claims the benefit of EP Application No. 20305151.1 filed on 18 Feb. 2020 which is incorporated by reference in its entirety.

TECHNICAL FIELD

The present embodiments relate generally to image generation and processing and more particularly to techniques for optimizing redundancy of images for camera arrays.

BACKGROUND

Conventional cameras capture light from a three-dimensional scene on a two-dimensional sensor device sensitive to visible light. Light sensitive technology used in such imaging devices is often based on semiconductor technology, capable of converting photons into electrons such as, for example, charge coupled devices (CCD) or complementary metal oxide technology (CMOS). A digital image photosensor, for example, typically includes an array of photosensitive cells, each cell being configured to capture incoming light. A 2D image providing spatial information is obtained from a measurement of the total amount of light captured by each photosensitive cell of the image sensor device. While the 2D image can provide information on the intensity of the light and the color of the light at spatial points of the photosensor(s), no information is provided on the direction of the incoming light.

Other types of cameras have been recently developed that provide for a richer and more image intensive product. One such camera is a Light Field camera. LightField cameras allow to capture a real content from various point of views. The 2 major families of light-field cameras are either: the matrix of cameras; or the plenoptic cameras. A matrix of cameras can be replaced by a single camera which is used to perform many acquisitions from various point of views. The light-field being captured is therefore limited to static scene. With plenoptic cameras, an array of micro-lenses is located between the main-lens and the sensor. The micro-lenses are producing micro-images which correspond to various point of views. The matrix of micro-images collected by the sensor can be transformed into the so-called sub-aperture images which are equivalent to the acquisition obtained with a matrix of cameras. The proposed invention is described considering a matrix of cameras, but would apply equally well to the set of sub-aperture images extracted from a plenoptic camera.

Light field images might be recorded using one of the following system category: plenoptic camera or camera arrays. Camera arrays are more flexible in terms of field of view and angles covering. Classic camera arrays setup are compact cameras mounted on metal frame positioned in a common plane and pointing at the same direction. Output images from the camera arrays are often processed to compute depth images and synthetized images from a virtual point of view. The computation of these images relies on the level of redundancy between all the input images and in many instances the prior art provides a lack of redundancy in many instances that ultimately results in missing parts in the production of the final images.

Consequently, it is desirous to provide techniques that provide adequate redundancy between the input and output results without causing missing information in the final processed and produced images.

SUMMARY

A method and system are provided for generating an image from one or more cameras in a camera array matrix. In one embodiment, the method comprises rotating direction of any cameras disposed in upper and lower rows of said matrix by a 90 degree angle around the roll axis, for example, based on a degree of redundancy between captured images. One or more cameras disposed at the corners of the matrix are rotated in an angle that is less than 90 degrees around the roll axis. Subsequently, the location of central cameras are determined and analysed so that they can be rotated and disposed in a manner for both horizontal and vertical compensation for any redundancies.

BRIEF DESCRIPTION OF THE DRAWINGS

Different embodiments will now be described, by way of example only, and with reference to the following drawings in which:

FIG. 22 is an illustration of a chart having the spacing comparisons with differently arranged embodiments;

DETAILED DESCRIPTION

Light-field image and video processing offers a much richer variety of image manipulation possibilities compared to traditional 2D images. However, capturing of high-quality light-fields is challenging because a huge amount of data has to be captured and managed. Often, a number of different views need to be combined together that are provided in high dynamic range, with excellent color and resolution. In addition, 2D images have to be manipulated so that they can be projected into a three-dimensional plane. In digital images, this involves providing a grid like plane representative of pixels. For every visible point in space, a 2D-image often provides the intensity of one or multiple pixels. In addition, other principals that are associated with stereoscopic images manipulation have to be considered such as providing two different views of a scene. This is because depth management is provided to a user's eye by providing slightly shifted images (parallax) for the left and the right eye to provide the depth impression. These requirements greatly increase the visual experience but they also significantly increase the volume of data that has to be captured, managed, stored and recovered.

Figure 1:
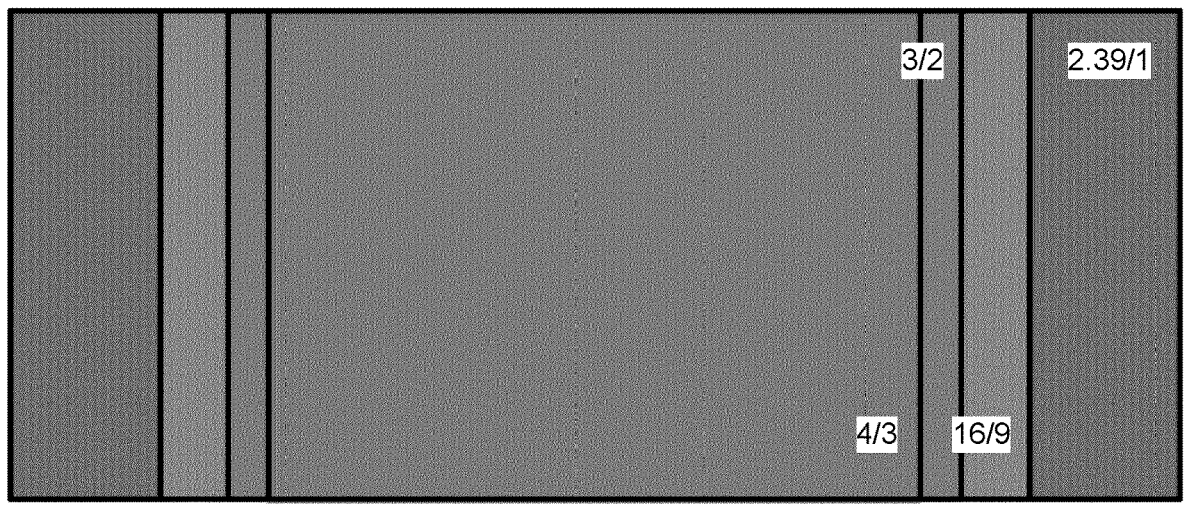
FIG. 1 is an illustration of a camera sensor format comparison with these and other setups FIG. 2 provides an example of an input image according to an embodiment.

Light field images might be recorded using one of the following system category: plenoptic camera or camera arrays. Camera arrays are more flexible in terms of field of view and angles covering. Classic camera arrays setup are often positioned in a common plane and pointing at the same direction and they contain camera sensors with commonly used have aspect ratios. In many prior art setups the aspect ratios vary between 4/3, 3/2 for photography and 4/3, 16/9, 2.39/1 for video but in alternate settings other less common formats may exist that provide for a different setup (1/1, 2/1 etc.). FIG. 1 is an illustration of a camera sensor format comparison. These formats are adapted to photo printing and display on screens.

In recent years with the advent of stereoscopic and even virtual and augmented reality applications, the contents produced by the camera arrays are then rendered on head mounted displays for 360 degrees viewing. In such cases, the camera aspect ratio is constrained in such a way to maximize the vertical and horizontal covering of the captured scene. In these and other similar applications, camera in arrays are arranged in a variety of ways: along one horizontal row, multiple rows and columns (rectangular or square shapes), all in one plane or convergent/divergent. However, in most conventional cases, the rotation along the roll axis remains the same. It might seem obvious to keep always the same neutral roll position to keep all images consistent but this approach has many drawbacks.

Figure 3:
FIG. 3 provides a synthetized image according to an embodiment with all cameras of an array in a same neutral roll position.
Figure 2:

Output images from the camera arrays are often processed to compute depth images and synthetized images from a virtual point of view. The computation of these images relies on the level of redundancy between all the input images and we can observe that the lack of redundancy results in missing parts or artifacts in the synthetized images. FIGS. 2 and 3 provides an example of this. FIG. 2 provides an example of an input image while FIG. 3 provides a synthetized image with all cameras in the same neutral roll position. As shown there are some information missing in FIG. 3.

In one embodiment as will be presently discussed, if the cameras are rotated along a roll axis, the redundancy can be better distributed within the final synthetized image. As will be discussed, in one embodiment two new camera array architectures can be presented that have the same external dimensions with specific camera orientation and position to optimize the redundancy between images and thus to improve the scene coverage of the synthetized images. Prior to discussing these new architectures, however, some background information should be discussed.

Figure 4:
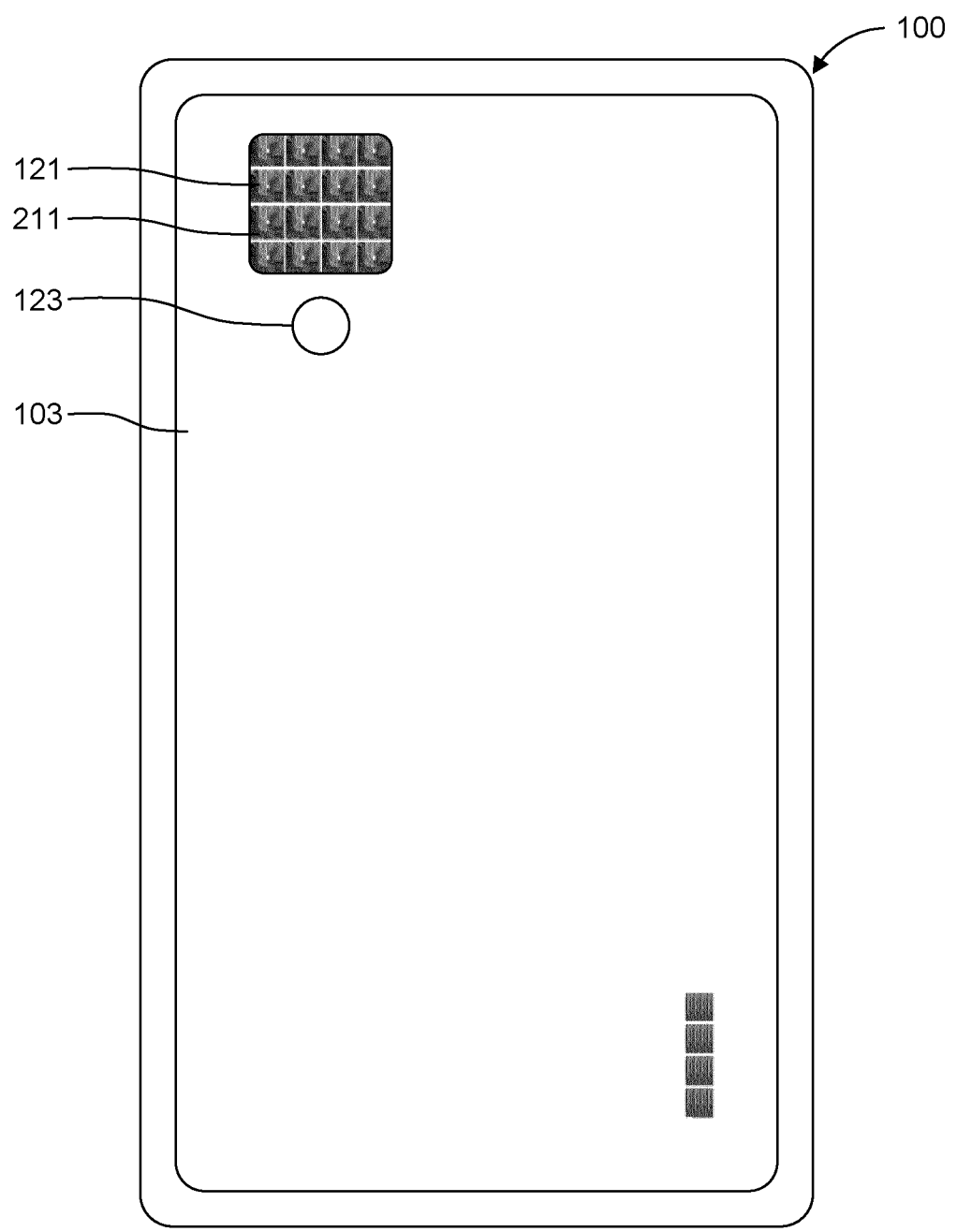
FIG. 4 provides an example of a smart device.

FIG. 4 provides a preview of a smart device. In this particular embodiment, for ease of understanding a smartphone is used but in alternate embodiments, other smart devices can be utilized.

In a first generation of smartphones that included dual cameras (around 2007), the goal was to record 3D photos. In later generation smartphones (circa 2014), devices with two cameras were provided with an objective of improving the low-light performance. Another objective was also to edit bokeh and take full advantage of the possibilities it provided. Soon the dual camera devices became standard but by 2018, many smart devices including smartphones with 3 or 4 cameras were introduced. New trends will provide camera array setup in smart devices such as smartphones that have many more (16 etc) cameras. Thus, optimized redundancy for these camera arrays are becoming more of an important concept.

Figure 5B:
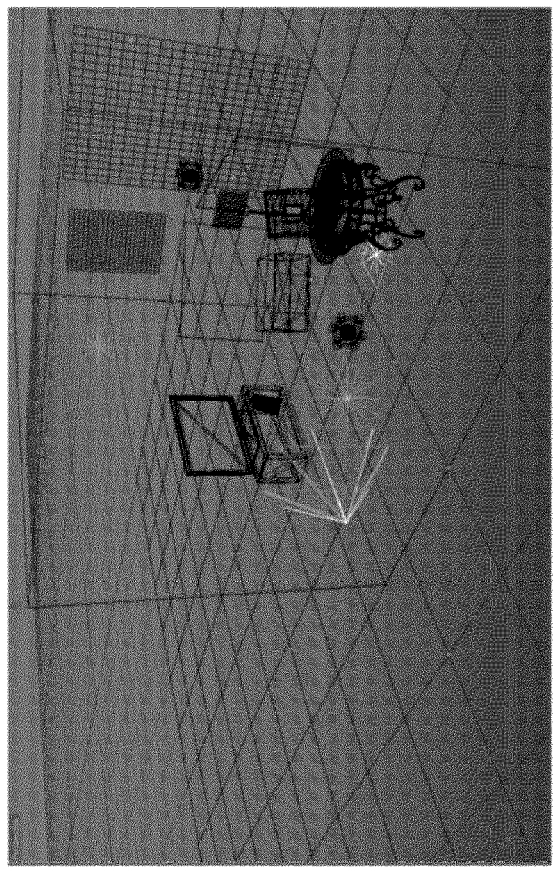
FIGS. 5A and 5B provides a perspective view of a synthetic scene in a quick shading and a wireframe format.
Figure 5A:
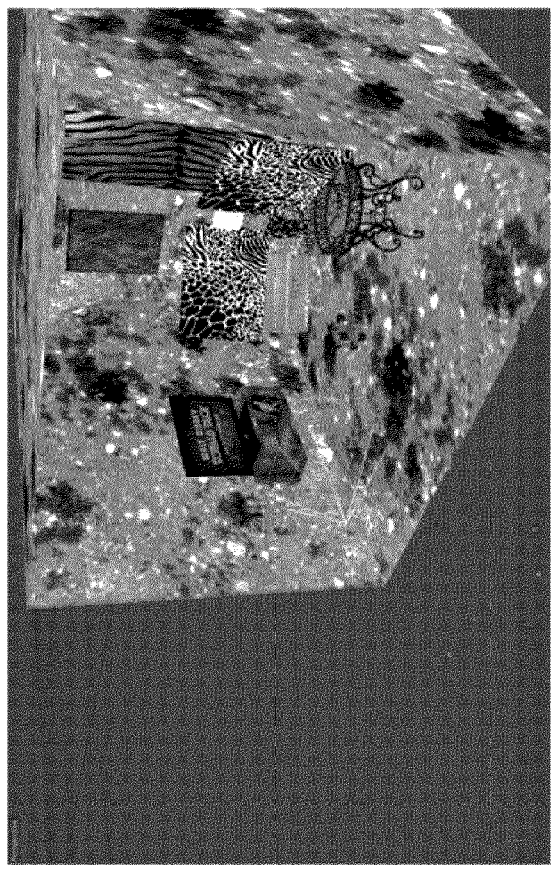

FIGS. 5A and 5B provides a perspective view of a synthetic scene in a quick shading and a wireframe format. This illustration is used to evaluate the performance of the different rig array configurations, a synthetic scene has been modeled in a 3D rendering application (Cinema 4D). This scene contains multiple objects placed at a distance varying between 1.4 to 5.1 meters and with different angular rotations relative to the cam array. The textures of the objects are deliberately not solid colors to ease the passive depth estimation.

Figure 6:
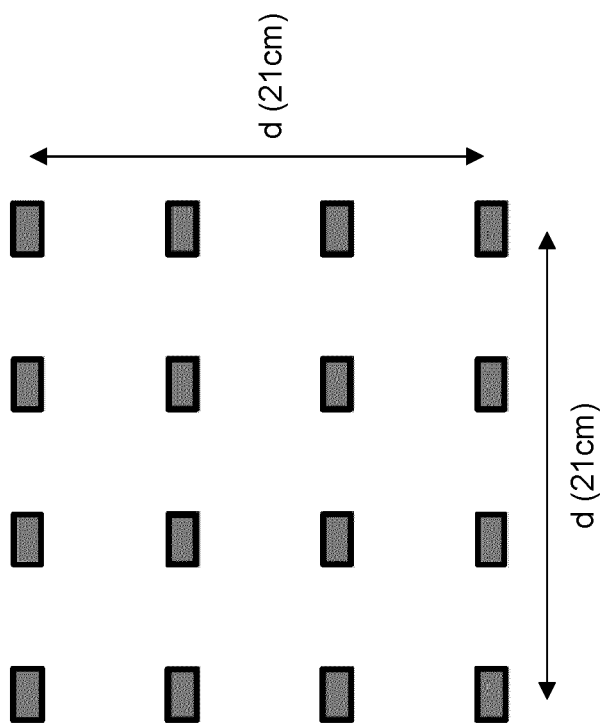
FIG. 6 show a conventional (classic) 4×4 camera array format used in the prior art, FIG. 7 provides 4×4 redundancy at 0.5 m, FIG. 8 provides 4×4 redundancy at 1 m, FIG. 9 provides 4×4 redundancy at 2 m and FIG. 10 provides 4×4 redundancy at 3 m
Figure 6:
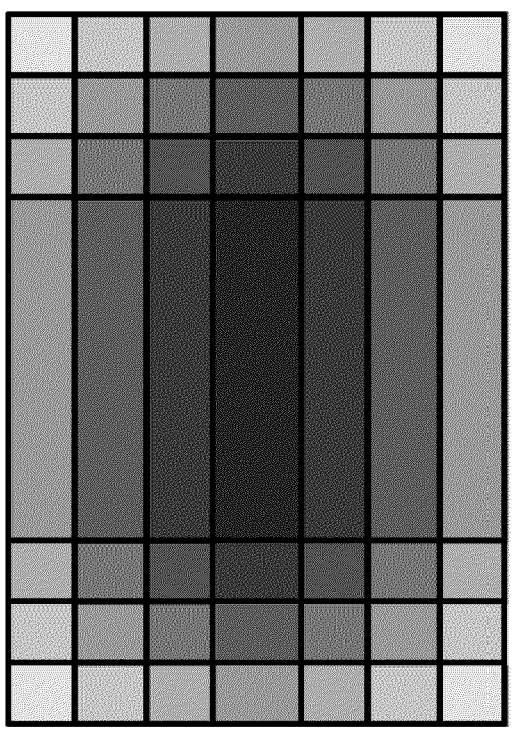

FIG. 6 show a conventional (classic) 4×4 camera array format used in the prior art, the reference camera array (4×4 shape) was arranged such that there were 4 cameras per row and 4 cameras per column. In one embodiment, this can be used as a baseline calculation for any number of cameras in a camera array. This can also be applied as a good example for a 4×4 camera array, with the understanding that the values obtained in some embodiments may not be always the same because some cameras may be different. However, in many instances, many of the cameras used in this format often possess characteristics similar to them.

Returning to the previous discussion, this shape is sometimes considered as the basic brick of the camera matrix market. In order to simulate a 16 image format, a particular (often 7 cm) distance is often kept between camera centers (often 21 cm distance between opposite cameras). Conventionally, many of the cameras used in this format often possess the following characteristics:

Focal length: 8 mm

Camera resolution: 1920×1080 pixels

Horizontal and vertical angle of view: 62°/37°

FIGS. 7-10 provide different embodiment and examples of the 4×4 classic camera arrangement disposed at different redundancy arrangements. As illustrated, FIG. 7 provides the classic 4×4 redundancy at 0.5 m, while FIG. 8 provides the classic 4×4 redundancy at 1 m, FIG. 9 provides the classic 4×4 redundancy at 2 m and finally FIG. 10 provides the classic 4×4 redundancy at 3 m.

In all these arrangements, the redundancy between cameras is dependent on the distance between the cameras and the subject. Multiple simulations were performed to evaluate the level of redundancy of the classic 4×4 camera array. In each case, the redundancy is particularly concentrated in the central portion of the captured scene lacking details on the borders, and the coverage of this array configuration is constraint by the camera sensor format (here landscape only).

Figure 12:
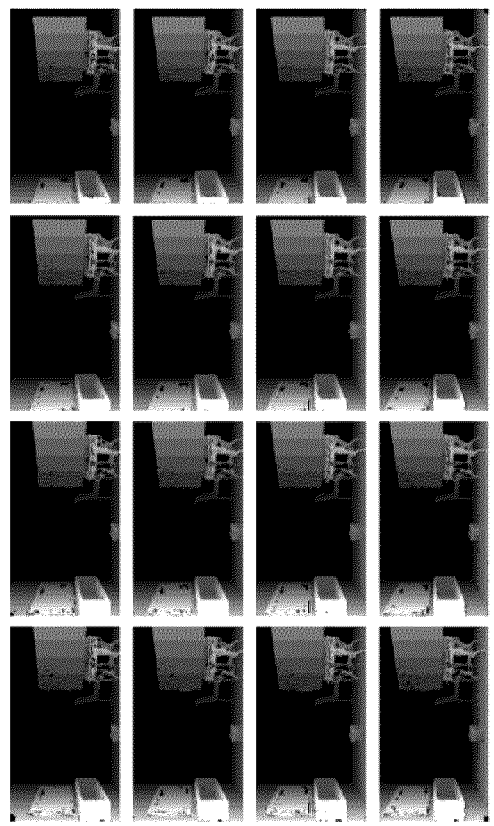
FIG. 12 is an illustration of 4×4 with depth estimation.
Figure 11:
FIG. 11 is an illustration of 4×4 output as RGB images.

These camera array structure can be used to obtain the 16 RGB images as direct output from the 16 cameras here but in alternate embodiments any number of cameras can be included. A depth estimation software uses these images and a calibration file as input and then compare for each pixel the RGB value from each camera to compute the depth. The result is provided in the illustrations of FIGS. 11 and 12. As shown, FIG. 11 is an illustration of the classic 4×4 output as RGB images and FIG. 12 is an illustration of the classic 4×4 with depth estimation. The RGB and the depth estimation images are then taken as input to produce a point cloud with the following condition: a 3D point is projected in space only if minimum two views estimate it at the same position with a 0.5 pixel maximum distance.

Figure 13:
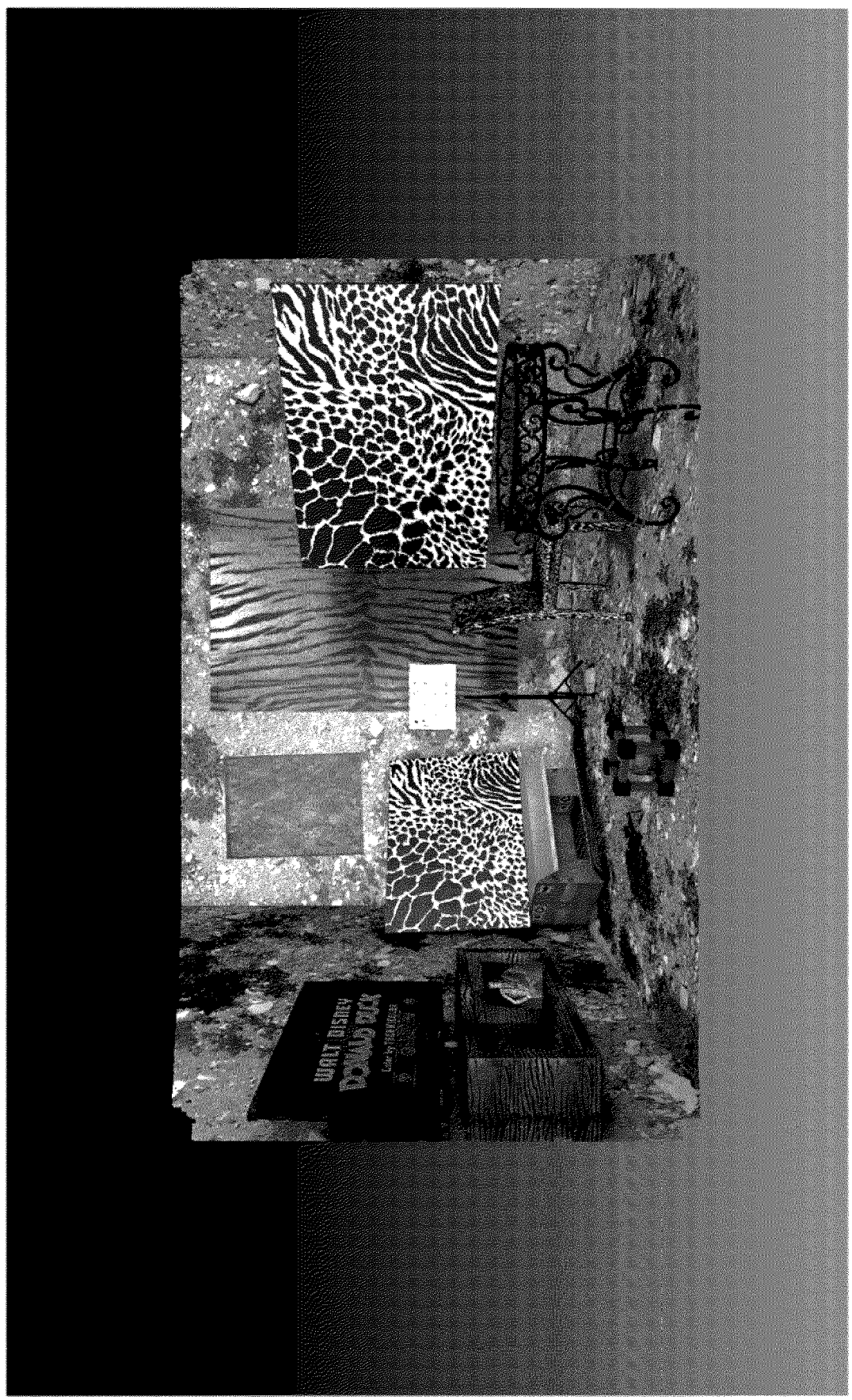
FIG. 13 provides an example of a point cloud illustration of a scene comprising of several objects.

FIG. 13 provides a point cloud illustration of a scene comprising of several objects. To extend the coverage of the captured scene while keeping the global size of the camera array. In one embodiment a proposal is to rotate one or more cameras on the roll axis. Considering the landscape 16:9 format of the cameras, an aim is to increase the global vertical field of view. A 90 degrees rotation can be applied on the cameras in the upper and the lower row. In order to avoid a sudden break in the point cloud between the upper, middle and lower vertical parts corner cameras are not be rotated by 90 degrees. A 45 degrees rotation for these 4 corner cameras permits a rounder overall shape to be obtained with a better 3D space distribution. The following illustration helps to better understand the global shape of this Z-roll optimized camera structure.

Figure 14:
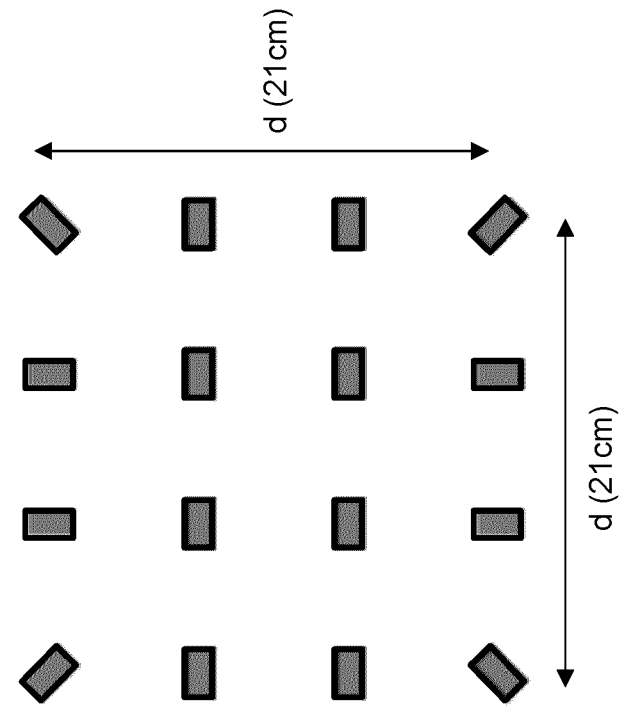
FIG. 14 is an example illustration of a Z-Roll optimization using a 4×4 camera array structure.
Figure 14:
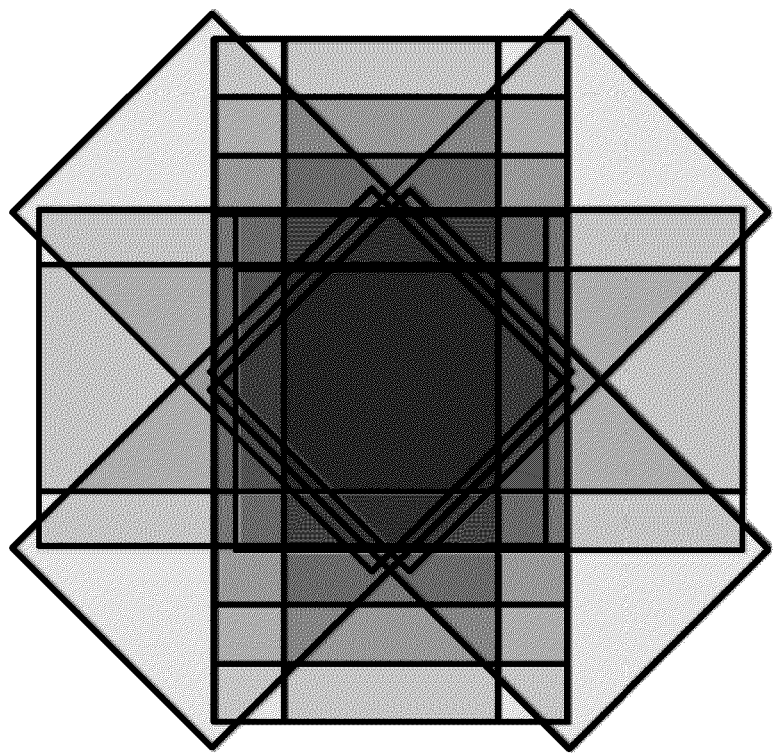
Figure 16:
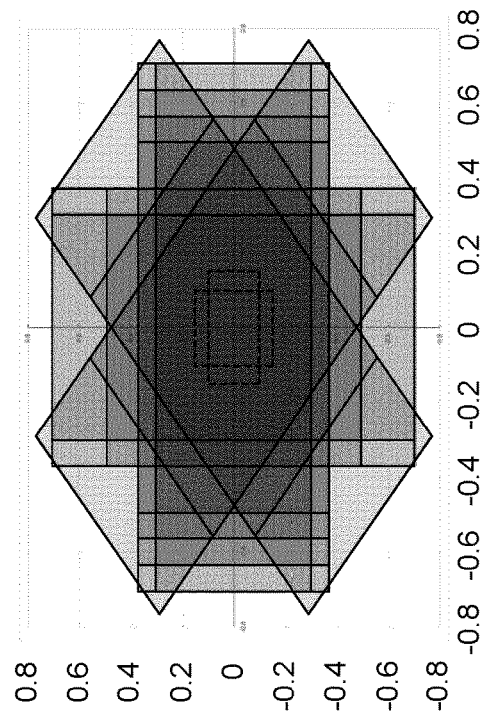
FIG. 16 is an illustration of a Z-roll redundancy at 1 m.
Figure 15:
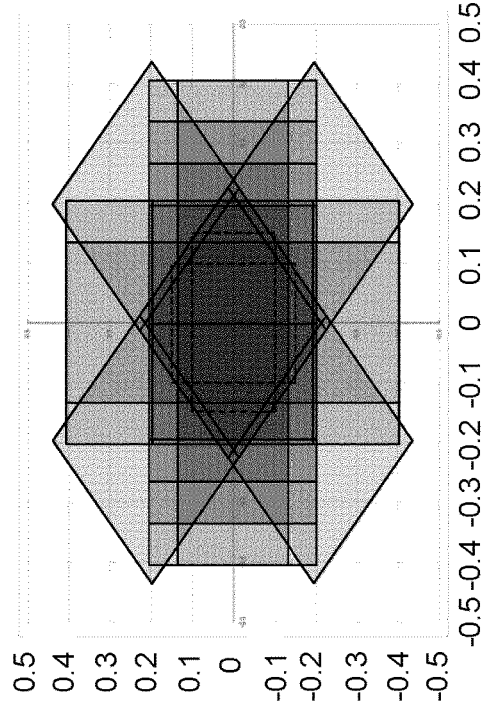
FIG. 15 is an example illustration of a Z-roll redundancy at 0.5 m.
Figure 18:
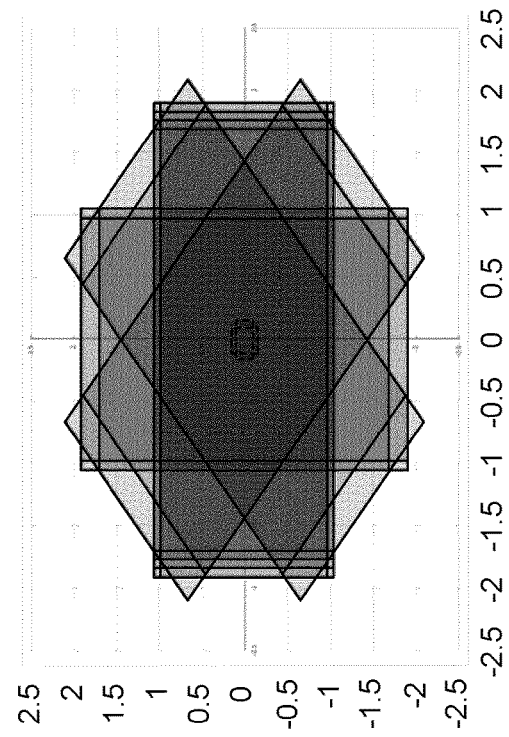
FIG. 18 is an illustration of a Z-roll redundancy at 3 m)
Figure 17:
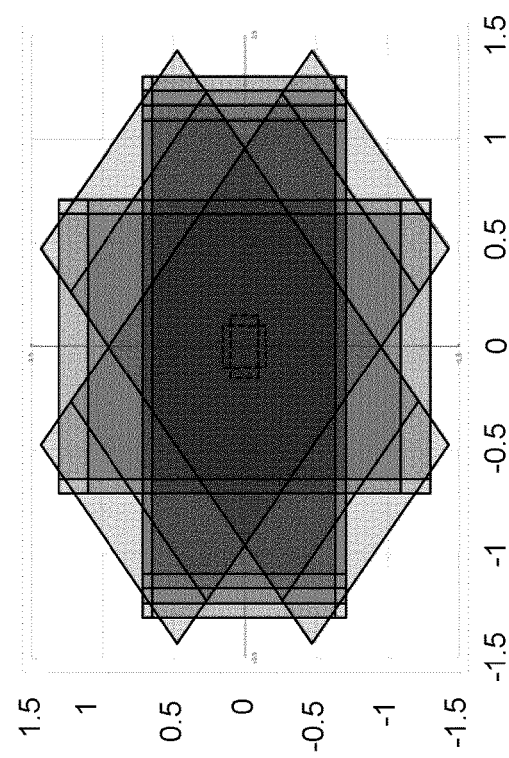
FIG. 17 is an illustration of a Z-roll redundancy at 2 m.
Figure 20:
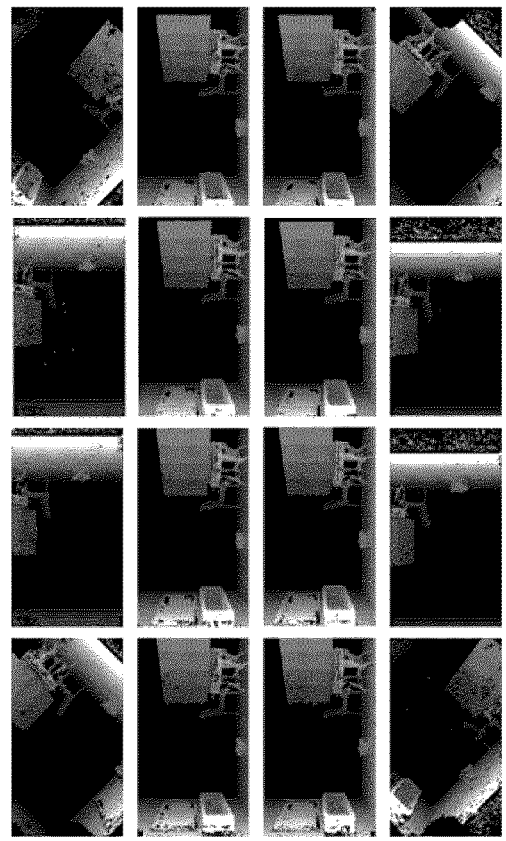
FIG. 20 is an illustration of a z-roll depth estimation respectively as provided by the camera images and a depth estimation software (to compute the depth maps)
Figure 19:
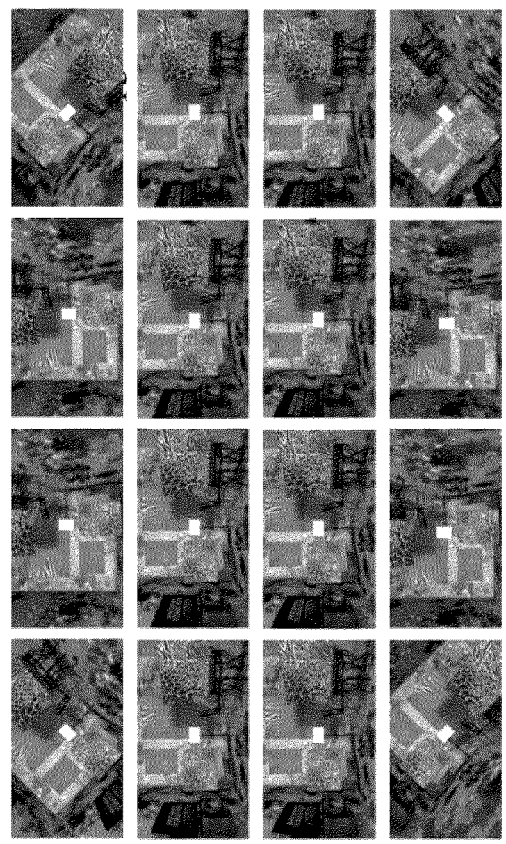
FIG. 19 is an illustration of a z-roll rendered RGB images.
Figure 21:
FIG. 21 provides the final result of the z-roll 3D point cloud.

The Z-Roll optimization using a 4×4 camera array structure is provided for ease of understanding in FIG. 14. To better visualize the impact on the level of redundancy, the same simulations on distances between 0.5 meter to 3 meters were done as illustrated in FIGS. 15 through 18 (FIG. 15: Z-roll redundancy at 0.5 m; FIG. 16: Z-roll redundancy at 1 m; FIG. 17: Z-roll redundancy at 2 m and FIG. 18: Z-roll redundancy at 3 m). FIGS. 19 and 20 provide the z-roll rendered RGB images and z-roll depth estimation respectively as provided by the camera images and a depth estimation software (to compute the depth maps). The result in this case is 32 images (16 RGB+16 Depth) that are then used to produce the corresponding point cloud with the same 25 condition as before (a 3D point is kept only if a 0.5 pixel difference max is evaluated between 2 views). FIG. 21 provides the final result of the z-roll 3D point cloud as illustrated. With a better distributed redundancy, there is a worthwhile difference in terms of 3D space coverage. It can be that some parts of this point cloud that are more sparse than the classical 4×4 configuration (the television and its support for example). This is due to the z-rolled cameras that reduce the redundancy of the central portion. The next embodiment configuration can help to address this issue.

A further embodiment relates to an off-centered and z-roll optimized 4×4 camera array. To counterbalance the loss of details on the central part of the point cloud when some cameras are rotated while maintaining the extended coverage of the captured scene and keeping the global size of the cam array constant, some central cameras are off-centered. The intuition behind this idea is that the 15 redundancy between cameras is still mostly concentrated in the center of the camera array. An example of an off-centered camera structure is depicted below. In this example, the four central cameras are shifted by 3 centimeters horizontally and 2 centimeters vertically. The horizontal direction is prioritized to compensate the weakened redundancy in the central portion, but the vertical direction is also slightly off-centered to 20 increase the density of 3D points in the upper and lower parts of the point cloud.

Figure 23:
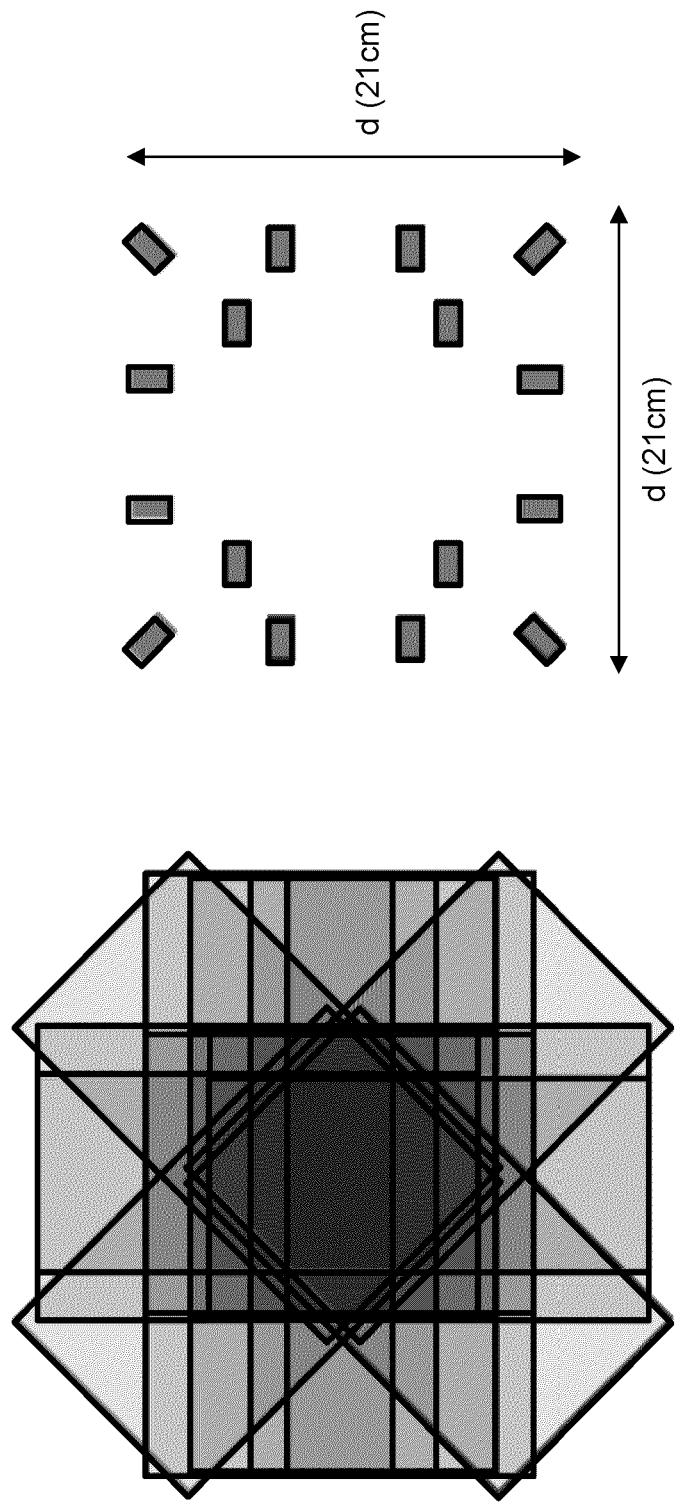
FIG. 23 is an illustration providing an off-centered and z-roll configuration.

FIG. 22 provides a chart illustrating the spacing comparisons with differently arranged embodiments. FIG. 23 provides an off-centered and z-roll configuration is previewed below. The shift of the four cameras results in a redundancy that is spread horizontally and vertically. This new camera configuration can be compared to the original and to the z-roll only configurations by viewing the simulations of redundancy between cameras. The gain seems minor but it will be more noticeable in the final point cloud.

Figure 24:
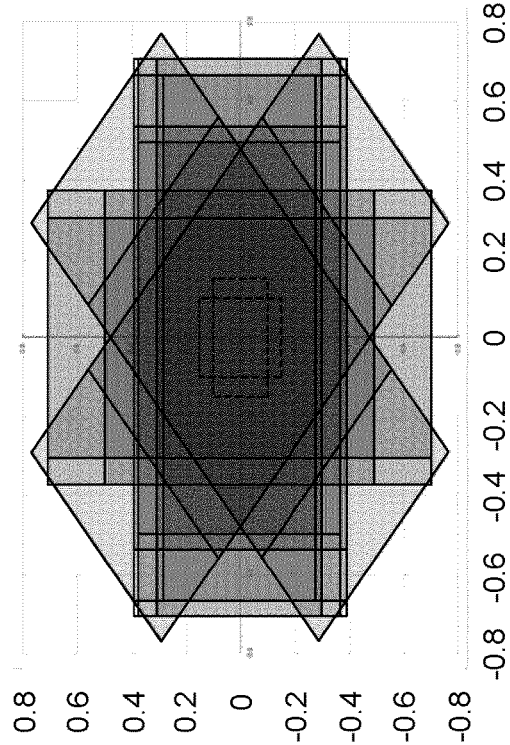
FIG. 24 is an illustration providing the off-centered redundancy at 0.5 m.
Figure 25:
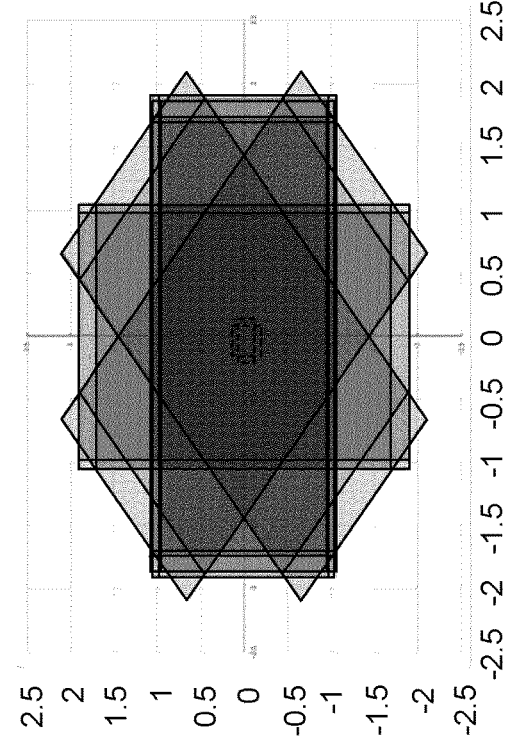
FIG. 25 is an illustration providing the off-centered redundancy at 1 m.
Figure 26:
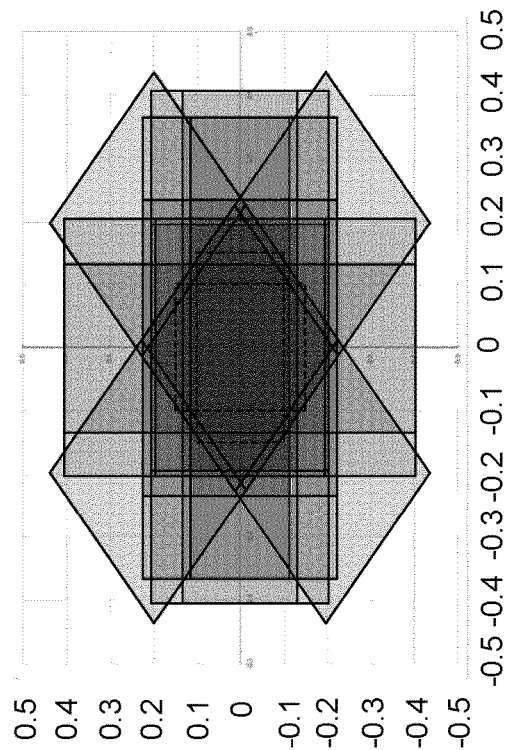
FIG. 26 is an illustration providing the off-centered redundancy at 2 m.
Figure 27:
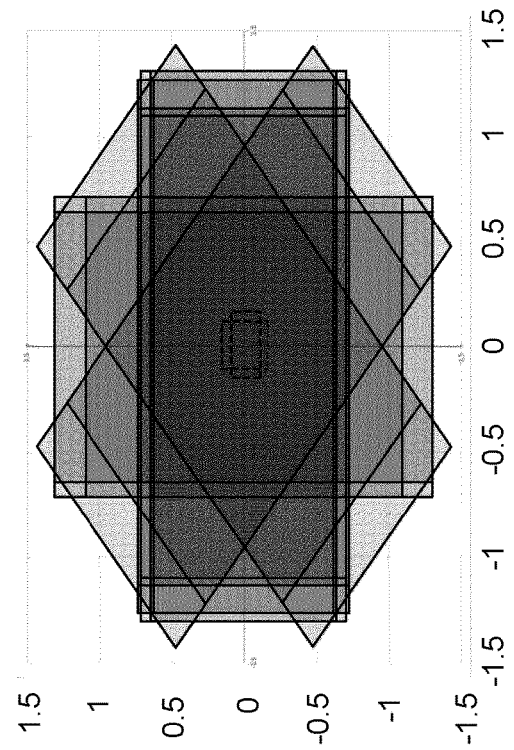
FIG. 27 is an illustration providing the off-centered redundancy at 3 m.
Figure 29:
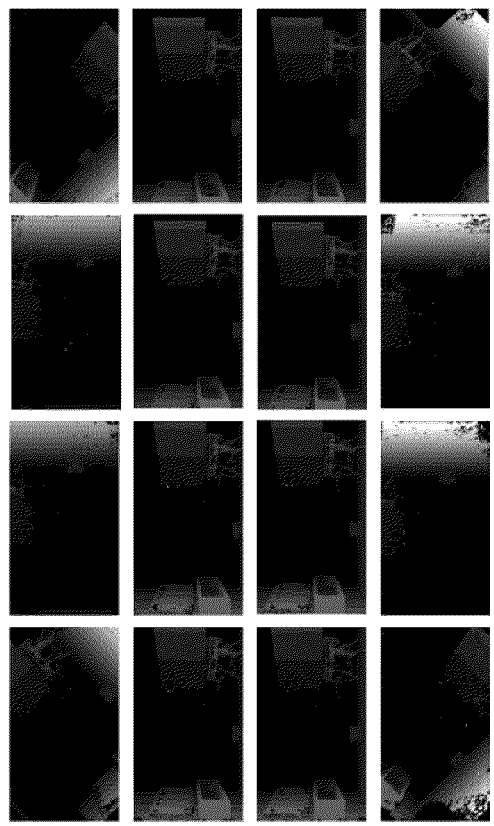
FIG. 29 is an illustration for the depth estimation as applied.
Figure 28:
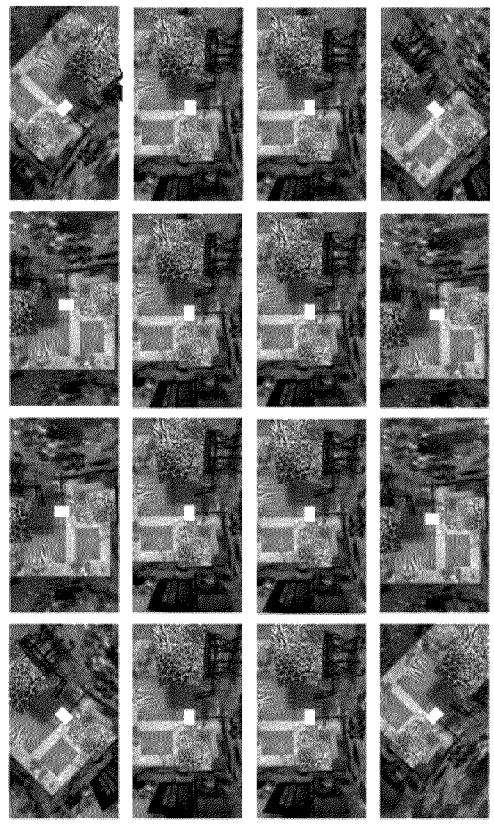
FIG. 28 is an illustration of the result for rendered RGB images.

As before, for comparison purposes, FIGS. 24 to 27 provide the rendering redundancies at different distances. FIG. 24 provides the off-centered redundancy at 0.5 m; FIG. 25 at 1 m; FIG. 26 at 2 m and FIG. 27 at 3 m. Applying these modifications to the camera array model in the 3D rendering application, the RGB images as shown in FIG. 28 will emerge and once the depth estimation is also applied, the illustration of FIG. 29 is provided.

Figure 30:
FIG. 30 is an illustration of a final point cloud corresponding to the off-centered+z-roll configuration as produced using the RGB and depth images.

In FIG. 30, the final point cloud corresponding to this off-centered+z-roll configuration is produced using the RGB and depth images. As can be seen, there is much improvement. With this latest configuration, the benefits of having an extended field of view but at the same time preserving the details in the central portion of the image. This camera array is built upon the same camera elements and keeps the same external dimensions of the classic 4×4 camera array characterized in the first chapter of this patent while having better image acquisition properties. 8 as before. In the output depth images, there are observable improvements around the borders.

The embodiment above that provides for the z-roll rotated and off-centered configurations can be applicable to all sorts of camera array including smartphones or other smart devices. In addition, there is no need to rotate a camera array to capture a portrait and new possibilities can be explored in recording a video scene that starts with a vertical subject (portrait) and that ends with a rather horizontal environment (landscape). One additional advantage is that the camera array's outer dimensions remain constant. The image redundancy can be spread to get a more constant depth estimation and an extended virtual field of view.

Figure 31:
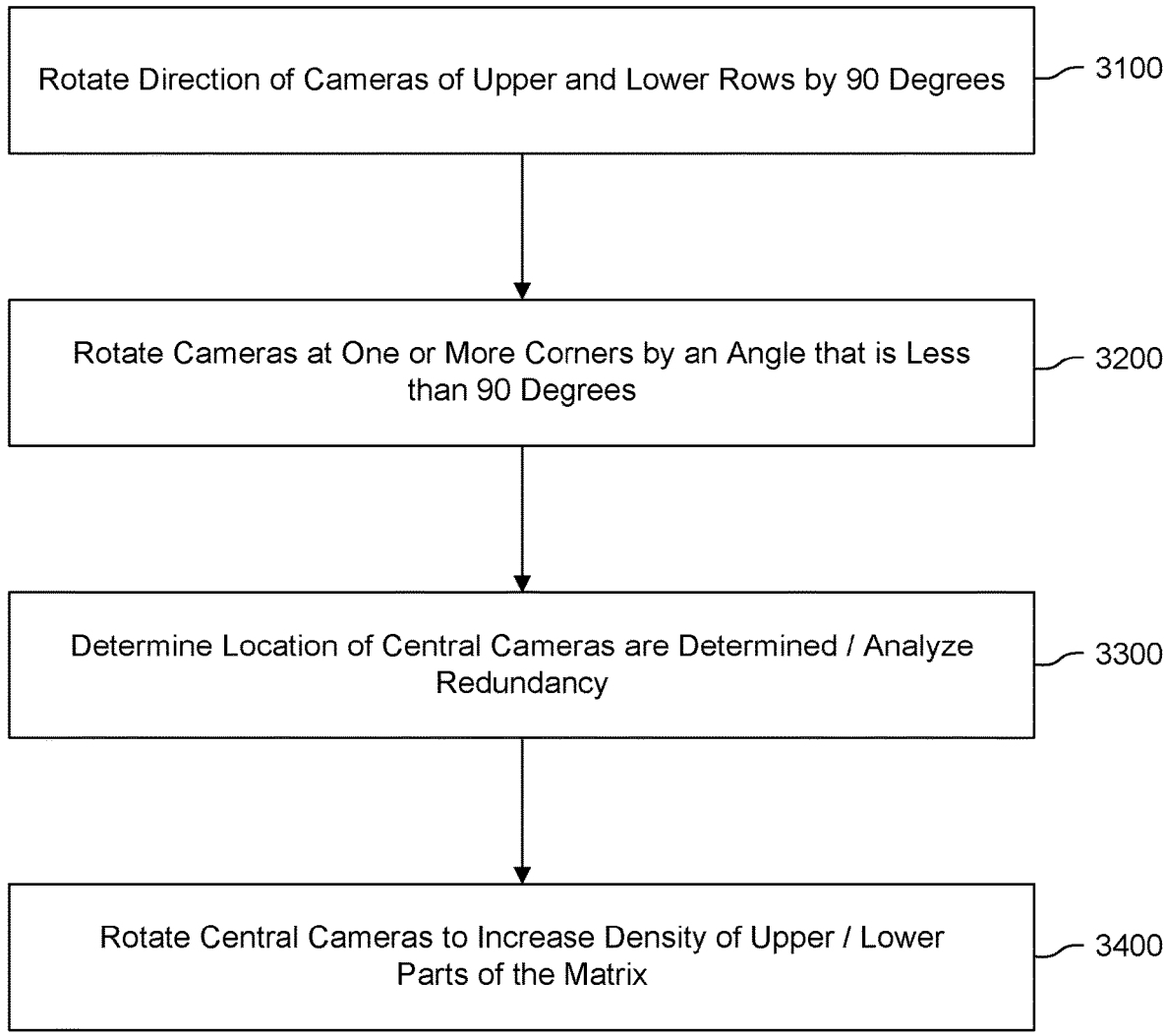
FIG. 31 is a flowchart illustration of one embodiment.

FIG. 31 is a flowchart illustration of one embodiment that is used to generate an image from each camera array in a camera array matrix. In step 3100, the redundancy between to be captured images from the camera matrix is reduced by rotating direction of any cameras disposed in upper and lower rows of said matrix by a 90 degree angle. When any degrees are discussed, it should be noted that they are meant to convey somewhat inaccurate measures so a 90 degree angled is deemed to be substantially 90 degrees and the like. In step 3200, any cameras disposed at the corners of the matrix are rotated in an angle that is less than 90 degrees. In step 3300, the location of central cameras disposed in the matrix are determined and their degree of redundancy is analyzed. Based on this determination and analysis, in step 3400, the central cameras are then rotated and disposed to provide them so as to be horizontally prioritized to compensate any image redundancy and vertically disposed to increase the density of the upper and lower parts of the camera matrix.

Figure 32:
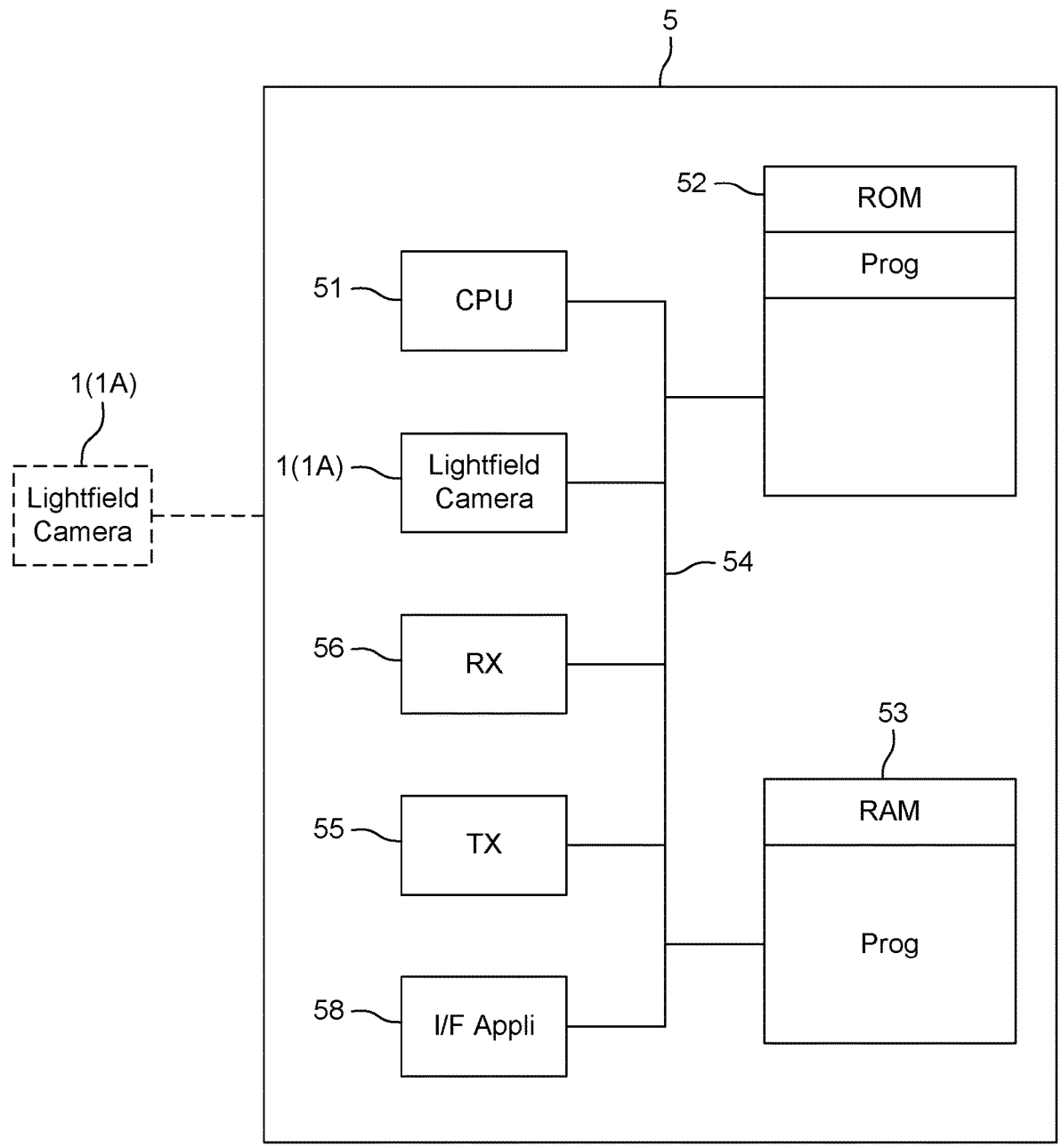
FIG. 32 is a diagram illustrating hardware configuration of a device which discloses various embodiments.

FIG. 32 is a diagram illustrating hardware configuration of a device in which one or more embodiments of the present disclosure can be implemented. Although it is depicted in FIG. 32 that a device 5 includes a camera 1, such as a lightfield camera 1 (or 1A that will be explained in later section of this description), a lightfield camera 1 can be configured separately from a device 5. A device 5 can be any device such as, for example, desktop or personal computers, smartphones, smartwatches, tablets, mobile phones, portable/personal digital assistants ("PDAs"), and other devices that facilitate communication of information between end-users and a lightfield camera 1. Lightfield camera 1 can also have a configuration of a device 5 inside.

The device 5 comprises the following elements, which are connected to each other by a bus 54 of addresses and data that also transports a clock signal: a processor 51 (or CPU), a non-volatile memory of ROM (Read Only Memory) type 52, a Random Access Memory or RAM 53, a radio interface (RX) 56, an interface 55 (TX) adapted for the transmission of data, a lightfield camera 1, an MMI (Man Machine Interface) 58 (I/F appli) adapted for displaying information for a user and/or inputting data or parameters.

It is noted that the term "register" or "store" used in the description of memories 52 and 53 designates in each of the memories mentioned, a memory zone of a low capacity as well as a memory zone of a large capacity (enabling a whole program to be stored in such memories or all or part of the data representing data received and decoded for such memories).

The ROM 52 comprises a program "prog". The algorithms implementing the steps of the method specific to the present disclosure and described below are stored in the ROM 52 memory and are associated with the device 5 implementing these steps. When powered up, the processor 51 loads and runs the instructions of these algorithms. RAM 53 notably comprises in a register and/or memory, the operating program of the processor 51 responsible for switching on the device 5, reception parameters (for example parameters for modulation, encoding, MIMO (Multiple Input Multiple Output), recurrence of frames), transmission parameters (for example parameters for modulation, encoding, MIMO, recurrence of frames), incoming data corresponding to the data received and decoded by the radio interface 56, decoded data formed to be transmitted at the interface to the application 58, parameters of the primary lens 10 and/or information representative of the centers of the micro-images formed by the microlenses of the microlens array. Other structures of the device 5, than those described with respect to FIG. 6, are compatible with the present disclosure. In particular, according to various alternative embodiments, the device 5 may be implemented according to a purely hardware realization, for example in the form of a dedicated component (for example in an ASIC (Application Specific Integrated Circuit) or FPGA (Field-Programmable Gate Array) or VLSI (Very Large Scale Integration) or of several electronic components embedded in an apparatus or even in a form of a mix of hardware elements and software elements. The radio interface 56 and the interface 55 are adapted for the reception and transmission of signals according to one or several telecommunication standards such as IEEE 802.11 (Wi-Fi), standards compliant with the IMT-2000 specifications (also called 3G), with 3GPP LTE (also called 4G), IEEE 802.15.1 (also called Bluetooth). According to an alternative embodiment, the device 5 does not include any ROM but only RAM where the algorithms implementing the steps of the method specific to the present disclosure are stored in the RAM.

Some processes implemented by embodiments may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as a "circuit", "module" or "system'. Furthermore, such elements may take the form of a computer program product embodied in any tangible medium of expression having computer usable program code embodied in the medium.

Since at least some elements can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

What is claimed:

1. A camera array for capturing an image, the camera array comprising:
   a matrix arrangement of a plurality of cameras in the camera array, wherein each camera in the camera array has a landscape sensor format, and wherein a reference orientation of each camera has a long axis of the landscape sensor format set along a horizontal axis;
   the matrix of cameras comprising:
   a plurality of cameras disposed in upper and lower rows of the matrix that are oriented vertically with respect to the horizontal axis;
   corner cameras disposed at corners of the matrix that are diagonally oriented with reference to the horizontal axis;
   a plurality of central cameras disposed in a center of the matrix, wherein, to compensate for image redundancy, at least one of the plurality of central cameras is positioned to be horizontally oriented with respect to the horizontal axis, wherein positioning the at least one of the central cameras in a horizontal orientation further comprises determining a location of the plurality of central cameras and analyzing a degree of redundancy of overlapping fields of view (FOV) of the cameras in the camera matrix.

2. The camera array of claim 1, wherein the plurality of central cameras located in the center of the matrix further comprises at least one camera vertically off-centered with respect to the horizontal axis, wherein the at least one center camera vertically off-centered increases an image density of upper and lower parts of the camera matrix.

3. The camera array of claim 1, wherein a first camera in the camera array operates with a processor to capture a first image and a second camera captures a second image, wherein the second camera in the camera array is adjacent to the first camera in the array.

4. The camera array of claim 3, wherein the first camera and the second camera, have an overlapping field of view (FOV).

5. The camera array of claim 4, wherein the processor compares the first image and the second image and analyzes their overlapping portions to remove redundancies.

6. The camera array of claim 1, wherein the processor synchronously captures a supplemental image from all cameras in the camera array.

7. The camera array of claim 6, wherein the processor compares the synchronously captured images and analyzes their overlapping portions to remove redundancies.

8. The camera array of claim 7, wherein the processor stitches portions of the captured images after redundancies are removed to generate a final image with higher resolution than each image of the images captured by each individual camera in the camera array.

9. A method utilizing a camera array comprising a matrix of cameras, the method comprising:
positioning a plurality of cameras disposed in upper and lower rows of the matrix to be oriented vertically with respect to a horizontal axis, the horizontal axis determined by a long axis of a landscape sensor format set of each of the plurality of cameras;
positioning a plurality of cameras disposed at corners of the matrix, the corner cameras having a diagonal orientation with reference to the horizontal axis; and
positioning at least one of the central cameras in a horizontal orientation to compensate for image redundancy, wherein positioning at least one of the central cameras in a horizontal orientation further comprises determining a location of a plurality of central cameras disposed in the camera matrix and analyzing a degree of redundancy of overlapping fields of view (FOV) of the cameras in the camera matrix.

10. The method of claim 9, further comprising:
positioning at least one of the central cameras located in the center of the matrix vertically off-centered with respect to the horizontal axis, wherein the at least one center camera vertically off-centered increases an image density of the upper and lower rows of the camera matrix.

11. The method of claim 9, further comprising capturing a first image from at least one of the cameras in the camera array and a second image from a second camera in the camera array adjacent to the first camera in the array.

12. The method of claim 11, comprising obtaining images from the first and second cameras, wherein the first and second cameras have an overlapping field of view (FOV).

13. The method of claim 12, further comprising comparing the first and second images and analyzing their overlapping portions to remove redundancies.

14. The method of claim 9, further comprising synchronously capturing a supplemental image from all cameras in the camera array.

15. The method of claim 14, further comprising comparing the synchronously captured images and analyzing their overlapping portions to remove redundancies.

16. The method of claim 15, further comprising stitching portions of the captured images after redundancies are removed to generate a final image with higher resolution than each image of the images captured by each individual camera in the camera array.

* * * * *